United States Patent [19]

Gunther et al.

[11] Patent Number: 5,261,323
[45] Date of Patent: Nov. 16, 1993

[54] BALER BELT ARRANGEMENT

[75] Inventors: Daniel Gunther, Morsbach; Arsène Roth, Walschbronn, both of France

[73] Assignee: Deere & Company, Moline, Ill.

[21] Appl. No.: 868,069

[22] Filed: Apr. 13, 1992

[30] Foreign Application Priority Data

Apr. 19, 1991 [DE] Fed. Rep. of Germany ....... 4112774

[51] Int. Cl.[5] .................... B30B 5/06; A01D 39/00
[52] U.S. Cl. ................................. 100/88; 56/341
[58] Field of Search .................. 100/5, 88; 56/341

[56] References Cited

U.S. PATENT DOCUMENTS

| 3,981,391 | 9/1976 | Phillips et al. | 56/341 X |
| 4,399,746 | 8/1983 | Viaud | 100/88 |
| 4,428,282 | 1/1984 | Anstey | 100/88 |
| 4,648,239 | 3/1987 | Geiser et al. | 100/88 |

FOREIGN PATENT DOCUMENTS 2575362  7/1986  France ................ 100/88

Primary Examiner—Harvey C. Hornsby
Assistant Examiner—Stephen F. Gerrity

[57] ABSTRACT

A round baler has a baling chamber formed in part by a plurality of belts engaged with a plurality of rolls extending between opposite side walls of the baler, the rolls and belts being located such as to define an enclosed zone next to the baling chamber. The belt arrangement is so designed that in conjunction with two rolls between which some of the belts extend directly there is used a roll arrangement which includes at least two axially aligned rolls offset from the other two rolls and being engaged by the remaining belts so that gaps are created between offset belts extending about the offset rolls and the non-offset belts extending directly between the first mentioned two rolls. These gaps serve to permit pieces of the material being baled to escape from the area otherwise enclosed by the belts. The offset rolls extend only over the width of the belts that run over them and are thus conducive for use with scrapers and/or augers which extend lengthwise of the offset rolls so as to prevent the material being baled from wrapping about the offset rolls.

9 Claims, 2 Drawing Sheets

BALER BELT ARRANGEMENT

BACKGROUND OF THE INVENTION

The present invention relates to round balers and, in particular, relates to a multiple belt arrangement forming a portion of an expansible baling chamber for a round baler, with the belts being supported over rolls such that, in at least one segment between two rolls, at least one of the belts is offset from the common plane of motion of the remaining belts so as to form a gap with the remaining belts. In a known round baler construction, the belts forming the baling chamber are mounted such that they enclose an area adjacent the baling chamber and into which pieces of crop enter through small gaps between adjacent belts. This escaping crop becomes trapped in this area and can lead to clogging. In order to prevent such pieces of crop from collecting in these enclosed areas, some of the belts are run over a roll offset from the plane of motion of the remaining belts so that a relatively large gap is presented for letting the pieces of crop exit from the enclosed area. Such a belt arrangement is disclosed in U.S. Pat. No. 4,399,746 issued on 23 Aug. 1983.

While the offset belt arrangement has been found to work in a satisfactory manner in some crop conditions to prevent plugging, in other crop conditions it has been found that crop materials tend to wrap about the offset belt support roll. Designers have tried to solve this wrapping problem by placing a scraper and driven auger device at opposite end sections of the roll to scrape the material from the roll and move it towards the large gaps. Such a scraper and auger arrangement is disclosed in U.S. Pat. No. 4,648,239 issued on 10 Mar. 1987. This scraper and auger arrangement doesn't entirely solve the wrapping problem since wrapping still occurs at times in areas of the offset roll located inwardly of the auger arrangements.

SUMMARY OF THE INVENTION

According to the present invention there is provided a baler having an expansible baling chamber formed by a plurality of belts which are supported in a novel manner for reducing the tendency of crop to become trapped in enclosed areas formed by the belts adjacent to the baling chamber.

A broad object of the invention is to provide a novel offset belt support roll arrangement for supporting balechamber forming belts in a manner for offsetting some belt sections relative to adjacent belt sections so as to form relatively large gaps.

A more specific object of the invention is to provide an offset roll arrangement as set forth in the previous object wherein the offset roll arrangement comprises a plurality of roll segments which are spaced axially one from the other.

Yet a more specific object of the invention is to provide an offset roll arrangement comprising separate roll segments wherein some of the segments are cantilevered from opposite side walls of the baling chamber.

Still another specific object of the invention is to provide an offset roll arrangement comprising separate roll segments wherein at least one of the segments is supported from a portion of the main frame extending between the opposite side walls.

These and other objects of the invention will become apparent from a reading of the ensuing description together with the appended drawings.

DESCRIPTION OF THE PREFERRED EMBODIMENT

Figure 1:
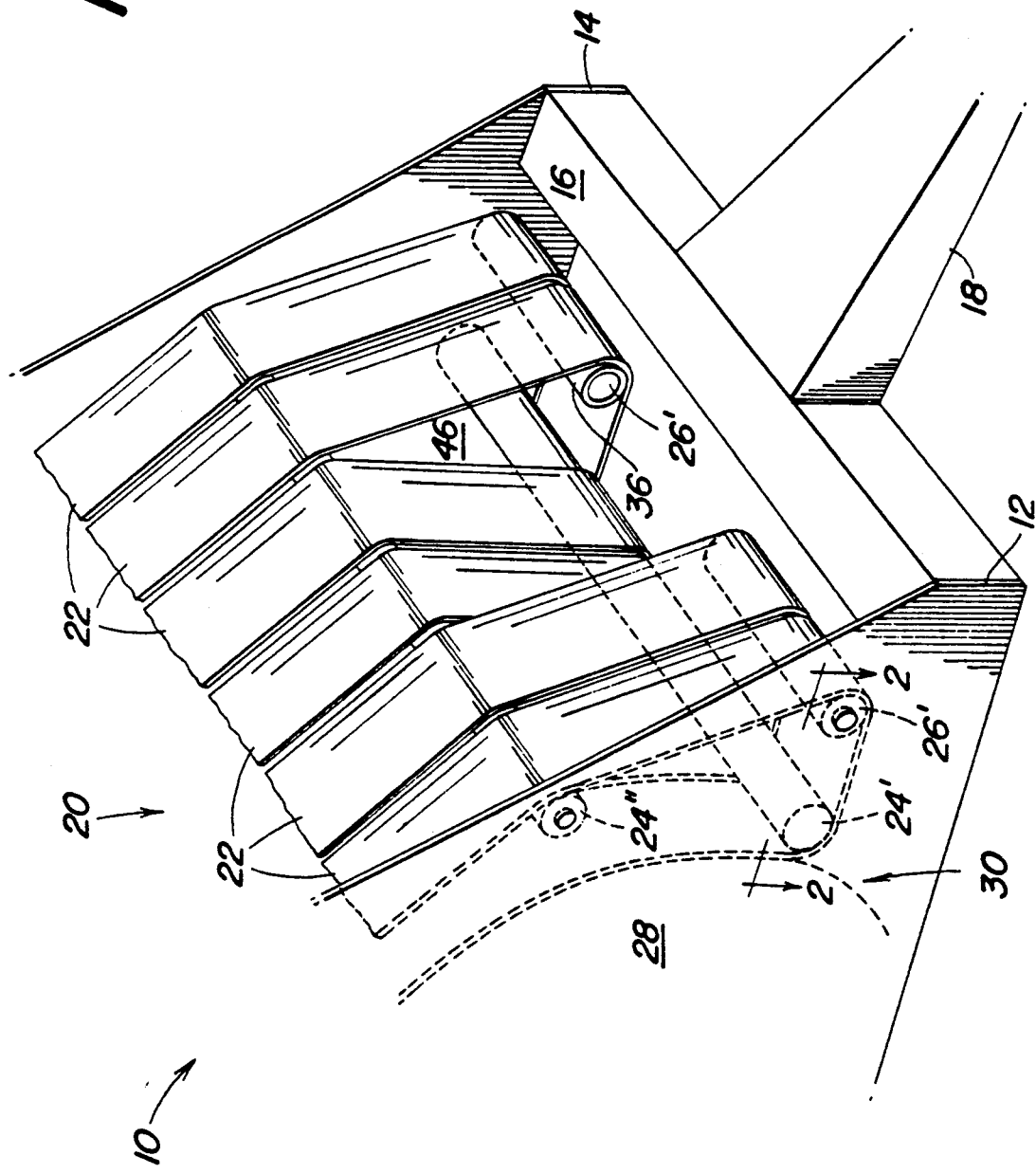
FIG. 1 is a partial perspective of view of a round baler with an expansible baling chamber formed by a plurality of belts supported in accordance with the principles of the present invention.

FIG. 1 shows the forward, upper region of a round baler 10, where a right and a left side wall 12 and 14 can be seen, each of which engages a cross-member 16 of the baler main frame. A drawbar 18 is attached to the cross-member 16 and extends to a prime mover (not shown). The round baler 10 is supported on wheels, not shown, and can be moved across a field by a prime mover in order to pick up crop deposited there and to bale it.

In order to bale the crop a belt arrangement 20 is provided which contains six belts 22 in this embodiment, which extend over a plurality of support rolls of which only a lower roll 24', a middle roll 24" and two cantilevered rolls 26' of an offset roll arrangement are shown.

The belt arrangement 20 is used to compact crop taken up from the ground by a pick-up, not shown, into a spiral to form a cylindrical bale 28 within an expansible baling chamber 30 formed in part by the belt arrangement 20 and the side walls 12 and 14. For this purpose, the belts 22 are run over a multitude of rolls of which at least one is driven and thereby imparts motion to the belts 22. The rolls are arranged in such a way that the belt arrangement 20 defines an inlet opening for the baling chamber 30 through which the crop or baling material is fed.

In this embodiment, the belts 22 are configured as flat belts with a profiled surface, and are arranged along side each other on the rolls except in the region of the pulleys 24', 24", 26', 26'. While six belts are provided, depending on the distance between the side walls 12, 14 more or fewer belts 22 can be supported across the rolls 24, 26.

The rolls 24' and 24" may each be of a well known construction including a cylindrical tube having bearings pressed into the opposite ends thereof, the bearings having inner races provided with hexagonal openings and receiving a bar of hexagonal cross section which extends through the cylindrical tube and has its opposite ends fastened to the side walls 12, 14. Thus, the rolls 24', 24" extend over the entire width of the belt arrangement 20 and hence of the baling chamber 30.

Except for the construction of the offset roll arrangement which is described in more detail below, the belt arrangement 20 is conventional and a more detailed description is omitted for the sake of brevity. However, if more details are desired, reference may be made to the aforementioned U.S. Pat. No. 4,399,746.

The present invention resides in the particular construction of the offset roll arrangement. Specifically, in the embodiment shown in FIGS. 1 and 2, the offset roll arrangement comprises the separate, axially spaced and aligned rolls 26′, 26′. Each of the rolls 26′ includes an axle 32 having its outer end fixed to a respective one of the side walls 12, 14 by conventional means, not shown, so that the axle is cantilevered from the wall. Rotatably mounted on each axle 32, as by a pair of spaced bearings 34, is a cylindrical roll body 36. In each case, the rolls 26′ extend over the width of two of the belts 22. However, with reference to the embodiment shown in FIG. 3, the rolls 26′ extend over the width of only a single belt 22. In other embodiments, such as that shown in FIG. 3, a further pulley 26″ may be mounted from the frame 16 so as to be positioned midway between the cantilevered rolls 26′. This roll 26″ is shown extending over the width of two belts 22 but with different sizes of balers may be sized to extend over the width of three or four belts 22.

Figure 3:
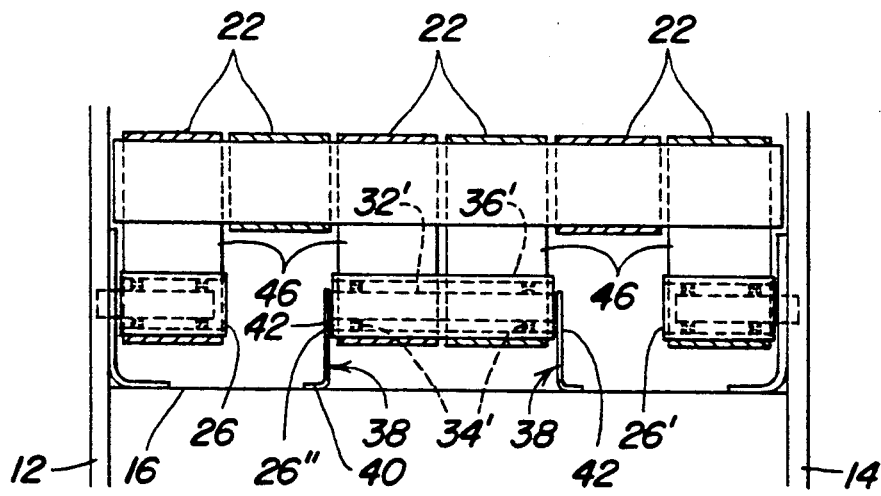
FIG. 3 is a horizontal sectional view similar to FIG. 2 but showing an alternate arrangement including a frame-supported roll as well as cantilevered rolls.

According to the embodiment shown in FIG. 3, each further roll 26″ consists of an axle 32′, a pair of axially spaced bearings 34′ and a cylindrical roll body 36′. In each case, the axle 32 is rigidly supported and supports through the bearings 34 the pulley body 36, free to rotate, over which the belts 22 run. Provided for supporting the axle 32′ from the frame 16 are a pair of L-shaped brackets 38 each having a short leg 40 attached to the cross-member 16 by welding or bolting and an upright long leg 42 located at and supporting a respective end of the axle 32′. Thus, as shown in FIG. 3, the roll 26″ is retained in position between the rolls 26′ and controls the offset of two of the belts 22 from the common plane of motion of the belts 22 adjacent those engaging the roll 26″ so as to form gaps 46 between these adjacent belts.

Figure 2:
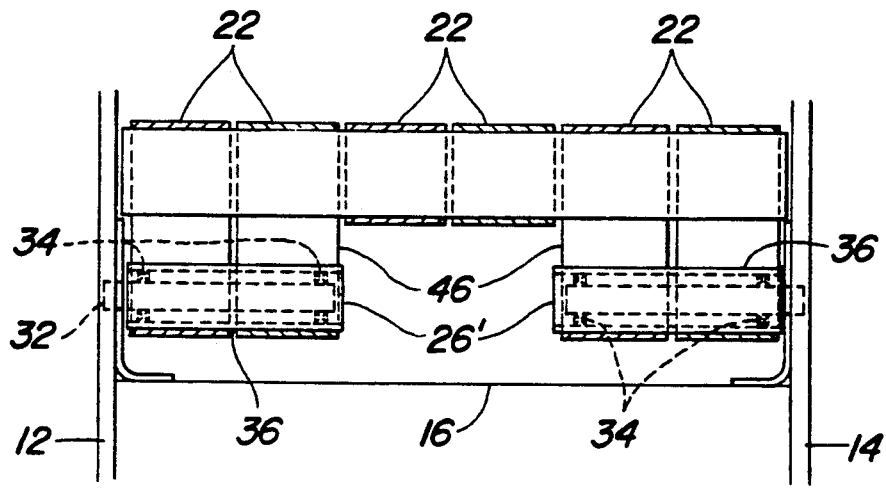
FIG. 2 is a horizontal sectional view taken along line 2—2 of FIG. 1 showing cantilevered rolls supporting some of the belts so as to form large gaps with adjacent belts.

Looking at the belt arrangement 20 shown in FIGS. 1 and 2, and beginning at the right side wall 12 the first and second belts 22 are run over one of the cantilevered rolls 26′. Following the first two belts 22 which are offset, the third and the fourth belts 22, or central pair of belts, extend directly, without forward offset, from the roll 24′ to the roll 24″ and hence are offset in the particular section with respect to the first belts 22. As a result of this offset, the gap 46 is created for permitting crop to escape from the area bounded by the belts 22 outside of the baling chamber. Following the fourth belts 22, the fifth and sixth belts 22 are run over the other cantilevered roll 26′, in the same manner as the first and second belts 22, and hence are also offset with respect to the central pair of belts 22. Thereby the further gap 46 is created through which crop can escape.

In the embodiment, according to FIG. 3, there is also a total of six belts 22. Again beginning at the side wall 12, it can be seen that the first belt 22 runs over the cantilevered roll 26′, the second belt 22 engages only the roll 24′ from where it goes directly to the roll 24″, not shown, the third and the fourth belts 22 run over the central roll 26″, the fifth belt 22, like the second belt, engages only the roll 24′ and the sixth belt runs over the roll 26′ cantilevered from the side wall 14. Thus, the first, third, fourth and sixth belts 22 are offset with respect to the second and the fifth belts 22 thus forming the two gaps 46 are through which crop can escape.

The roll bodies 36 of the rolls of the offset roll arrangement may be configured as straight cylinders in the area of contact with the belts 22, or they may be crowned, with a bal-shaped circumference. In addition, their surface may be provided with a helix, that assists in the removal to the side of crop entrained there and a scraper and/or an auger may be used to aid in keeping crop from wrapping about the rolls by deflecting or transporting crop to the gaps. It will be appreciated that in the latter construction, the fact that the rolls 26′ terminate at the gaps 46 makes it necessary only to clean crop from the short length thereof in order to prevent wrapping thereabout.

Instead of being arranged symmetrically as disclosed, the rolls of the offset roll arrangement may also be arranged asymmetrically.

We claim:

1. In a round baler including a main frame extending between opposite side walls and a belt arrangement comprising a plurality of belts supported in side-by-side relationship by a plurality of rolls located between the opposite side walls with the belts cooperating with the side walls to form a baling chamber and an enclosed area adjacent the chamber and wherein said plurality of rolls includes first, second and third rolls with the third roll, as viewed looking towards one side of the baler, being offset relative to a line of centers passing through the first and second rolls and wherein a number of said plurality of belts extend directly from the first to the second roll but with at least one of said plurality of belts extending from said first to said third roll and then to said second roll such that said at least one of said plurality of belts is offset from a common plane of motion of said number of belts and, together with an adjacent one of said number of belts, creates a gap through which particles of material being baled may pass from the enclosed area, an improved roll arrangement comprising: said third roll having a length substantially equal to the width of the belt or belts supported thereby.

2. The baler defined in claim 1, wherein said third roll includes a shaft cantilevered from one of the side walls and a cylindrical body rotatably mounted on the shaft by a pair of axially spaced bearings.

3. The baler defined in claim 2, wherein said plurality of rolls includes a fourth roll located in axial alignment with said third roll; at least another one of said plurality of belts engaging said fourth roll; said fourth roll having a length substantially equal to the width of the belt or belts in engagement therewith; and said fourth roll including an axle cantilevered from the side wall opposite to that to which the third roll is mounted, and a cylindrical body rotatably mounted on the last named axle by a pair of bearings.

4. The baler defined in claim 3 wherein said plurality of rolls includes at least a fifth roll located between and in axial alignment with the third and fourth rolls and spaced from each thereof by at least the width of one of the plurality of belts; at least a further one of said plurality of belts engaging said fifth roll; said fifth roll having a length substantially equal to the width of the belt or belts engaged therewith; and means supporting said fifth roll from the main frame.

5. The baler defined in claim 4 wherein said fifth roll includes an axle and a cylindrical main body rotatably mounted on the axle by a pair of bearings; and said means supporting said fifth roll comprises a pair of brackets secured to opposite ends of the axle and to the main frame.

6. The baler defined in claim 4 wherein two of said plurality of belts are engaged with said fifth roll.

7. The baler defined in claim 3 wherein said third and fourth rolls are each engaged by two of the plurality of belts.

8. The baler defined in claim 1, wherein said third roll includes an axle, a pair of brackets secured to opposite ends of the axle and to said main frame, and a cylindrical body rotatably mounted on the axle by a pair of axially spaced bearings.

9. The baler defined in claim 1, wherein said plurality of rolls includes at least a fourth roll which is axially aligned with and spaced axially from the third roll by at least the width of one of said plurality of belts; at least another one of said plurality of belts engaging said fourth roll; and said fourth roll having a length substantially equal to the width of the belt or belts in engagement therewith.

* * * * *